(12) United States Patent
Muraishi

(10) Patent No.: US 6,761,402 B1
(45) Date of Patent: Jul. 13, 2004

(54) STRUCTURE OF A VEHICLE SEAT

(75) Inventor: Masami Muraishi, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/459,469

(22) Filed: Jun. 12, 2003

(51) Int. Cl.[7] ............................................. B60N 2/42
(52) U.S. Cl. .............................. 297/216.1; 297/216.13; 296/68.1; 296/65.01
(58) Field of Search .................... 297/216.1, 216.13, 297/452.18, 487, 463.1, 463.2; 296/68.1, 63

(56) References Cited

U.S. PATENT DOCUMENTS

| | | | | |
|---|---|---|---|---|
| 4,512,604 | A | * | 4/1985 | Maeda et al. ............. 296/68.1 |
| 5,584,525 | A | * | 12/1996 | Nakano et al. ........... 296/68.1 |
| 5,882,060 | A | * | 3/1999 | Walk et al. ............. 296/65.01 |
| 5,938,265 | A | * | 8/1999 | Oyabu et al. ............ 296/68.1 |
| 6,161,892 | A | * | 12/2000 | Chabanne et al. ...... 296/65.03 |
| 6,176,543 | B1 | * | 1/2001 | Nawata et al. .......... 296/68.1 |
| 6,227,595 | B1 | * | 5/2001 | Hamelin et al. ........ 296/65.03 |
| 6,299,238 | B1 | | 10/2001 | Takagi et al. |
| 6,595,591 | B2 | * | 7/2003 | Fourrey et al. ........ 297/440.11 |
| 6,604,599 | B2 | * | 8/2003 | Yamaguchi et al. ........ 180/271 |

FOREIGN PATENT DOCUMENTS

| | | |
|---|---|---|
| JP | 08-026144 | 1/1996 |
| JP | 09-169232 | 6/1997 |

* cited by examiner

*Primary Examiner*—Peter M. Cuomo
*Assistant Examiner*—Erika Garrett
(74) *Attorney, Agent, or Firm*—Browdy and Neimark, P.L.L.C.

(57) ABSTRACT

A structure of seat in which a reinforcing element is provided to protect it against deformation due to a lateral collision. The reinforcing element comprises a reinforcing rod and a pair of plate elements fixed to the respective two ends of the reinforcing rod. This reinforcing element is attached to the outer surface of a pre-assembled seat unit so as to extend transversely of the seat unit. Further, the two plate elements are disposed adjacent to a lateral side of the vehicle and adjacent to a floor tunnel in vehicle, respectively, so that a lateral load applied to the lateral side of vehicle is transmitted through the reinforcing element to the floor tunnel.

2 Claims, 3 Drawing Sheets

STRUCTURE OF A VEHICLE SEAT

BACKGROUND OF THE INVENTION

1. Field of the Invention

The present invention relates to an automotive or vehicle seat and in particular to a structure of automotive or vehicle seat which prevents the seat against deformation in the case of lateral collision where a great force is applied to a lateral side of a vehicle in which the seat is provided.

2. Description of Prior Art

In many of conventional automobiles and vehicles of rear-drive sedan types, there is formed the so-called floor tunnel of a generally inverted-U-shaped cross-section in the floor of vehicle. Typically, the floor tunnel projects upwardly from the floor of vehicle and extends centrally of the floor in the fore-and-aft or longitudinal direction of the vehicle body, so that a drive shaft (or propeller shaft) extends in and through the tunnel from the forward side to the backward side of the vehicle for transmission purpose. Also, in the vehicle, a pair of seats are mounted on the floor so as to be disposed symmetrically relative to such floor tunnel.

Some of the vehicle seats are provided with a protection structure against deformation due to a lateral collision. For instance, a transverse reinforcing member is attached by welding to a seat frame in the seat (e.g. a seat cushion frame or a seat back frame) in a widthwise direction of an automobile or vehicle, so that, in the case of a lateral collision where one vehicle collides with a lateral side of another vehicle, a great force applied to the lateral side of vehicle is transmitted through the transverse reinforcing member to the above-stated floor tunnel. In other words, an external great force applied from an outer lateral side to an inner side of the vehicle is transmitted through both seat frame and transverse reinforcing member to a central point where the floor tunnel is located. That is, the great force transmitted from an outer lateral wall or a door of vehicle is escaped from the transverse reinforcing member to the floor tunnel, thereby preventing the seat against deformation and thus protecting an occupant on the seat.

This sort of seat structure has been disclosed from the U.S. Pat. No. 6,299,231 and Japanese Laid-Open Patent Publication No. 9-169232, for example. In such prior-art seat structure, after having welded the transverse reinforcing member to the seat frame, a foam padding or similar buffer member is affixed over that seat frame, and thereafter, a trim cover assembly is attached on the thus-affixed foam padding. With this structure assembly, however, the reinforcing member itself interferes with the attaching of the trim cover assembly on the foam padding, which makes it difficult for a worker to neatly attach a whole of the trim cover assembly on the foam padding. Further, the fact that the trim cover assembly and foam padding are juxtaposed on the reinforcing member results in making an occupant on the resultant seat feel a hard touch of that reinforcing member, so that the occupant can not sit on the seat with a soft comfortable touch.

SUMMARY OF THE INVENTION

In view of the above-stated drawbacks, it is a purpose of the present invention to provide an improved structure of seat which avoids the obstacle of the reinforcing member in assembling the seat.

In order to achieve such purpose, in accordance with the present invention, there is provided a structure of seat in combination with a vehicle having a lateral side, a floor and a floor tunnel formed upwardly in the floor, which basically comprises:

a pre-assembled seat unit formed by: a framework; a cushion member integral with the framework; and a trim cover assembly securely attached on the cushion member; and a reinforcing means for reinforcing the pre-assembled seat unit, the reinforcing means comprising:

a reinforcing rod having one end and another end;

a first plate element fixed to that one end of the reinforcing rod; and a second plate element fixed to that another of the reinforcing rod;

wherein the reinforcing rod is securely attached on the trim cover assembly so as to extend in a direction transversely of the pre-assembled seat unit and securely fixed by a securing means to the framework in the pre-assembled seat.

It is another purpose of the invention to provide an improved structure of seat sufficient to withstand a great lateral load applied thereto in the case where other vehicle collides against the lateral side thereof.

For that purpose, the foregoing first plate element is disposed adjacent to the lateral side of vehicle, while the foregoing second plate element is disposed adjacent to the floor tunnel. Preferably, a reinforcing member may be provided for a seat back frame and may comprise: a first plate element; a second plate element; a horizontal reinforcing rod connected between the first and second plate elements so as to extend horizontally therebetween; and a slanted reinforcing rod connected between said first and second plate elements so as to extend aslant therebetween, wherein the reinforcing member is securely attached on the backward side of a seat back so as to extend in a direction transversely of the seat back and securely fixed to a seat back frame, such that said first plate element is disposed adjacent to the lateral side of vehicle, while the second plate element is disposed adjacent to the floor tunnel, and that the slanted reinforcing rod extends aslant downwardly in a direction from the lateral side of vehicle toward the floor tunnel.

Other various features and advantages will become apparent from reading of the descriptions hereinafter, with reference to the annexed drawings.

DETAILED DESCRIPTION OF PREFERRED EMBODIMENT OF THE INVENTION

Figure 1:
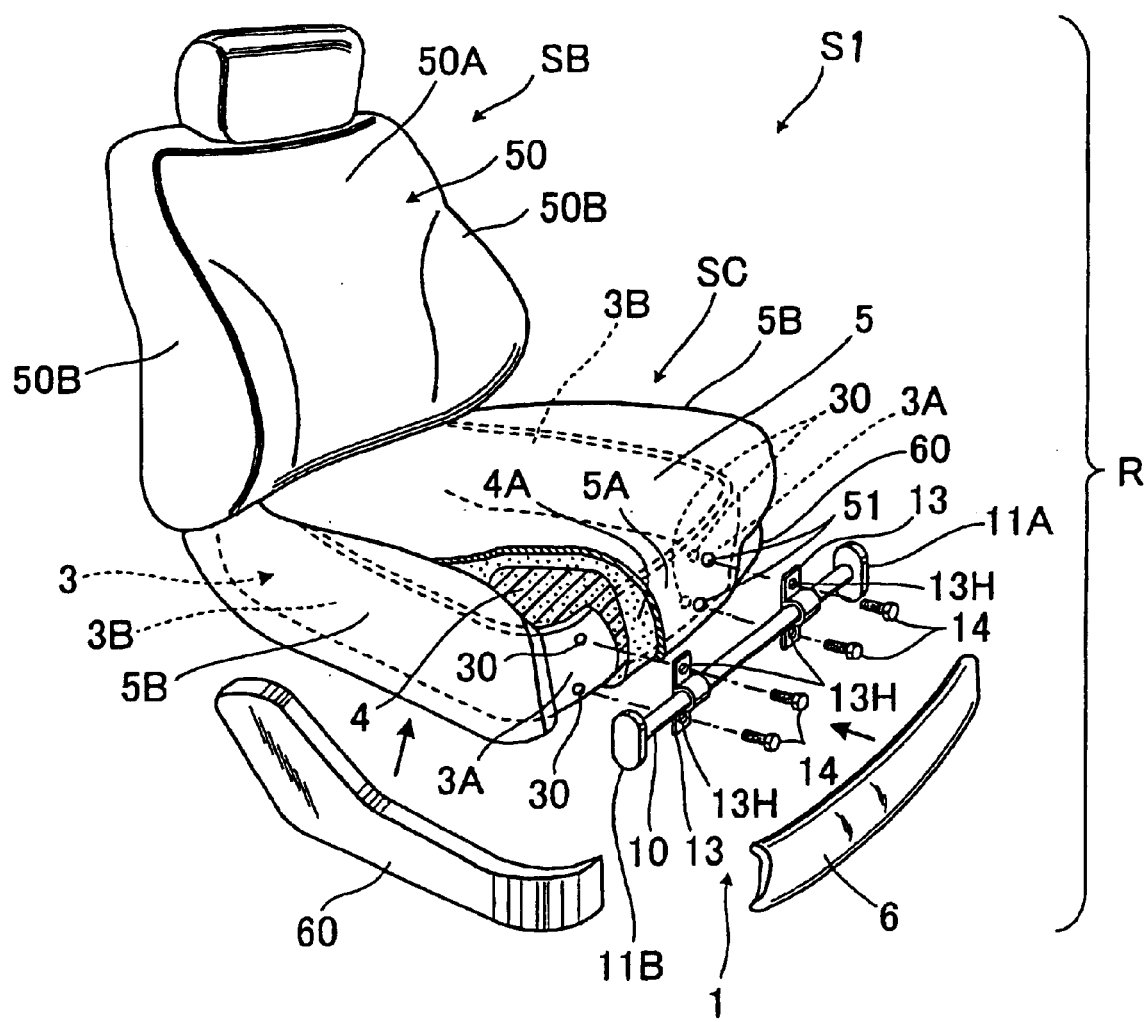
FIG. 1 is a partly broken and exploded perspective view of a vehicle seat, showing the state where a structure of the present invention is provided at a seat cushion of the vehicle seat.
Figure 2:
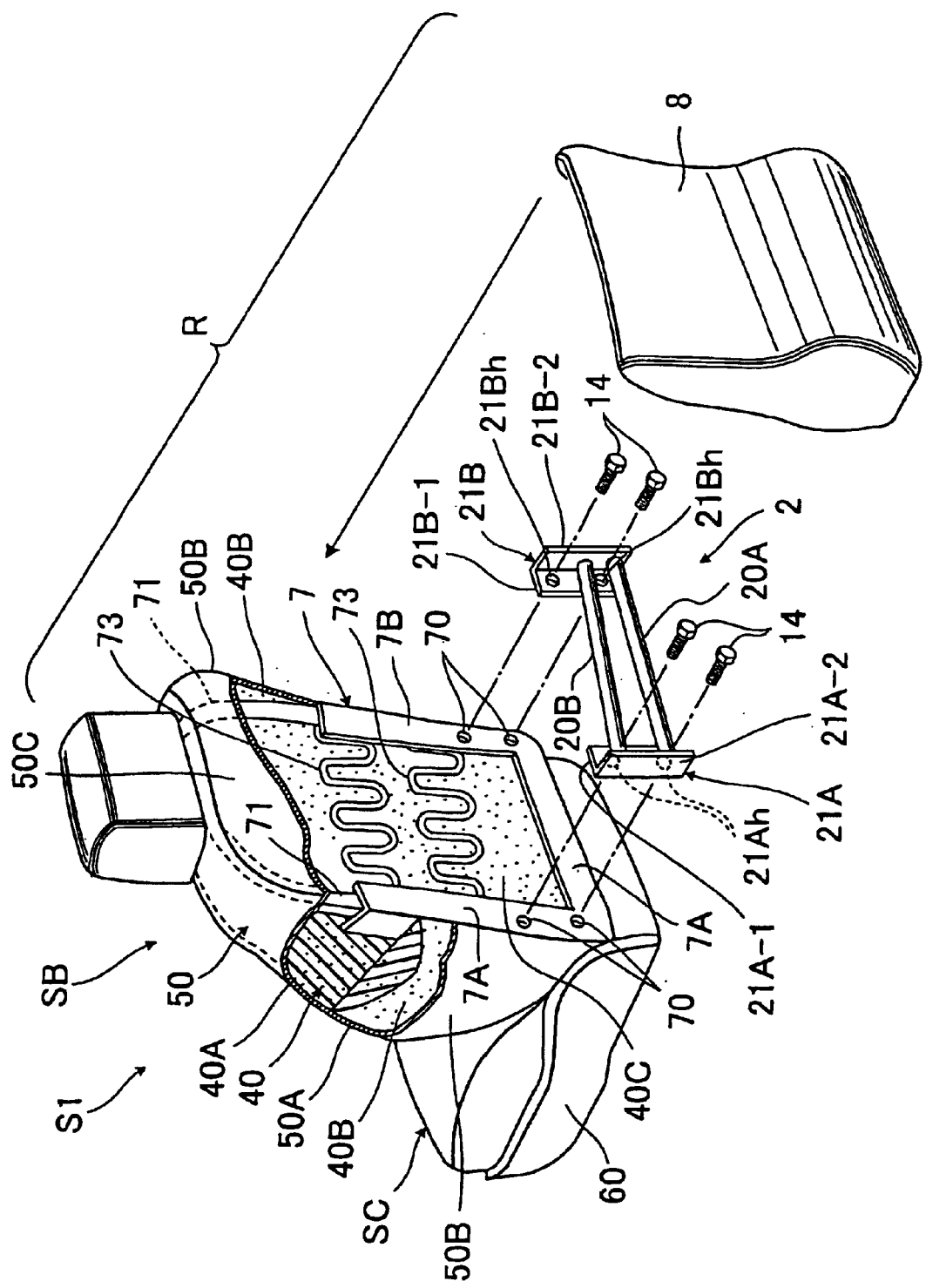
FIG. 2 is a partly broken and exploded perspective view of the vehicle seat, showing the state where a structure of the present invention is provided at a seat back of the vehicle seat.
Figure 3:
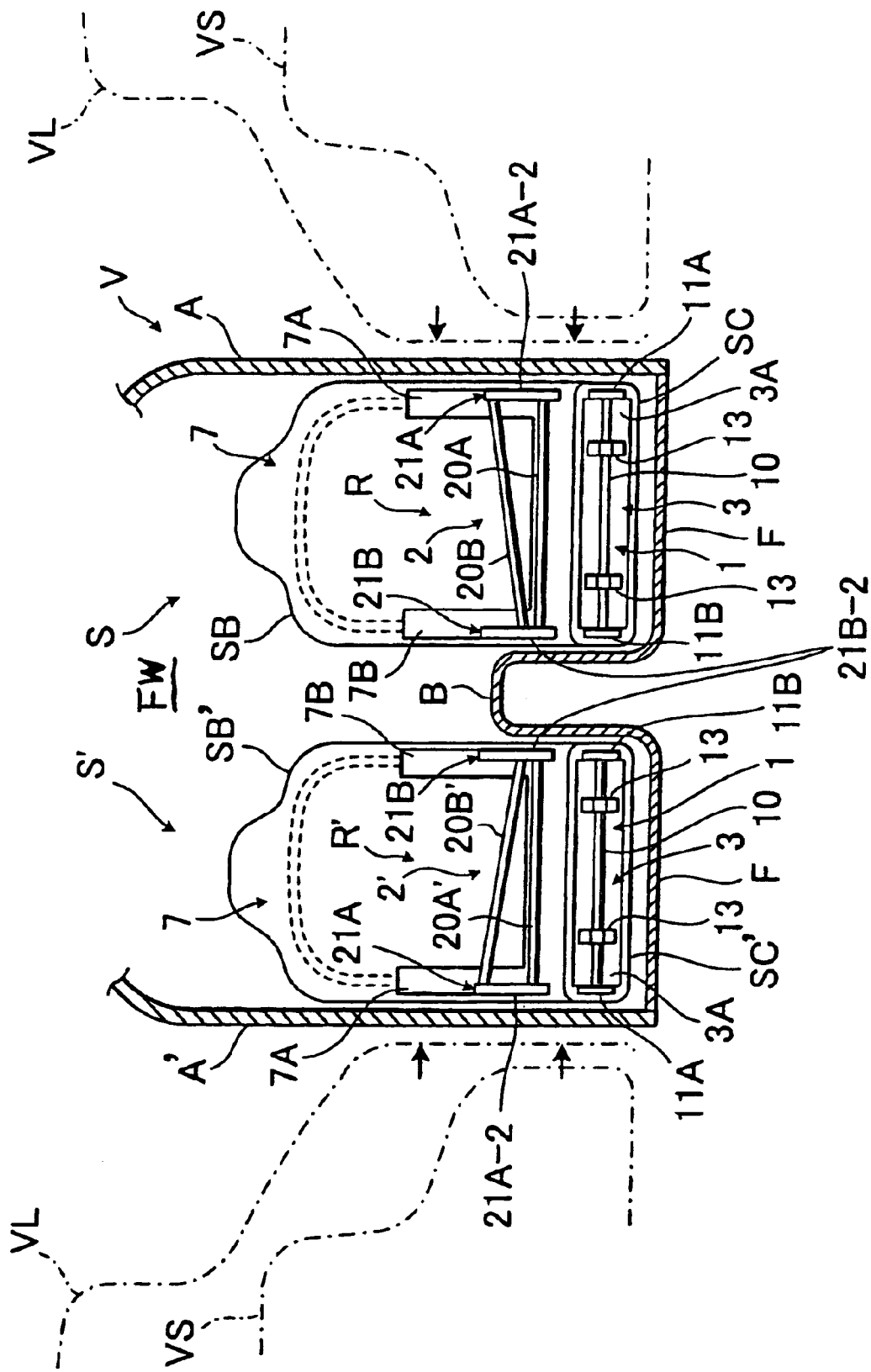
FIG. 3 is a cross-sectional view of a vehicle in which a pair of seats provided with the structure of the present invention are mounted.

Referring to FIGS. 1 to 3, there is illustrated a preferred embodiment of a structure of seat for automobile or vehicle, as generally designated by (R), in accordance with the present invention.

Designation (S1) represents a pre-assembled seat unit to which the structure (R) is applied, the seat unit typically comprising a seat back (SB) and a seat cushion (SC).

At first, as shown in FIG. 1, the seat cushion (SC) is preformed to have a seat cushion frame (3) and an upholstery integral with the seat cushion frame (3), the upholstery being typically of a two-layer lamination type composed of a foam cushion member (4) integral with the seat cushion frame (3) and a trim cover assembly (5) covering the foam cushion member (4).

The seat cushion frame (3) is shown to include a forward vertical wall portion (3A) and a pair of lateral vertical wall portions (3B) (3B). Formed in the forward vertical wall portion (3A) are one pair of vertically spaced securing holes (30) (30) and another pair of securing holes (30) (30), such that those two pairs of securing holes (30) (30) are spaced apart laterally of each other, as illustrated in FIG. 1. While not shown, each securing hole (30) is so threaded as to be threadedly engageable in a securing nut (14).

The trim cover assembly (5) and foam cushion member (4) are generally upholstered on the entirety of the seat cushion frame (3). As shown, the two forward vertical walls (4A) and (5A) respectively of the foam cushion member (4) and trim cover assembly (5) are juxtaposed with each other, and further, those vertical walls are juxtaposed on the forward vertical wall (3A) of seat cushion frame (3). Although not clearly shown, it is to be understood that, likewise as in the two pairs of holes (30) of seat cushion frame (3), two pairs of vertically spaced holes (at 51) are formed on the forward vertical section (5A) of trim cover assembly (5), and also, while not shown, two pairs of vertically spaced-apart holes are formed on the forward vertical section (4A) of foam cushion member (4). It is further to be understood that all the foregoing holes are aligned with one another so that the securing bolts (14) are inserted through and secured in the respective holes, as will be described later.

Designation (1) represents a first reinforcing member (1) provided on the forward vertical wall of the seat cushion (SC) corresponding to the forward vertical cover section (5A) of trim cover assembly (5). This reinforcing member (1) comprises a tubular reinforcing rod (10) and a pair of first and second load transmission plate members (11A) which are respectively fixed to the two ends of the tubular reinforcing rod (10). The whole length of the reinforcing member (1) is generally equal to a whole width of the forward vertical wall (5A) of seat cushion (SC) (including the width-wise length of the corresponding forward vertical walls (4A) (5A) respectively of the cushion member (4) and trim cover assembly (5)). Attached about the tubular reinforcing rod portion (10) are a pair of securing pieces (13) (13), each having two securing holes (13H) (13H) formed therein.

The first reinforcing member (1) is firmly fastened on the forward vertical cover section (5A) of trim cover assembly (5) by inserting securing bolts (14) through all the aligned holes, i.e. the holes (13H) of the securing pieces (13) and the holes of trim cover assembly (5) and cushion member (4) (e.g. at 50), and then threadedly engaging the four securing bolts (14) with the respective four holes (30).

Designation (6) denotes a forward decorative cover of synthetic resin material which is adapted to cover the thus-attached first reinforcing member (1) as well as the forward vertical wall of seat cushion (SC). Designations (60) (60) denote a pair of lateral decorative covers, each being of synthetic resin material, which is adapted to cover the respective two lateral sides of seat cushion (SC) corresponding to the respective two lateral sections (5B) (5B) of trim cover assembly (5).

As understandable from FIG. 1, the forward decorative cover (6) is attached over the first reinforcing member (1) and secured to the forward vertical wall (at 5A) of seat cushion (SC) by means of proper securing elements, such as bolts and nuts, welding and the like. On the other hand, the two lateral decorative covers (60) (60) are respectively attached on and secured to the two lateral cover sections (5B) (5B) of trim cover assembly (5) by means of such proper securing elements.

Reference is made to FIG. 2 which particularly shows the seat back (SB). Seat back (SB) includes a seat back frame (7) and an upholstery integral with the seat back frame (7), the upholstery being, as likewise in the above-described seat cushion (SC), of a two-layer lamination type composed of a foam cushion member (40) and a trim cover assembly (50) covering the foam cushion member (40).

The seat back frame (7) is comprised of: a generally "U" shaped lower frame portion formed by a lower horizontal frame (7A) and a pair of vertical frame portions (7B) (7B); and a generally inverted-U-shaped tubular frame portion (71) firmly connected with the pair of vertical frame portions (7B). As shown, the two vertical frame portions (7B) are each formed with a pair of vertically spaced-apart securing holes (70) (70) in the lower region thereof. The sinuous springs (73) are extended in the seat back frame (7).

It is noted that both seat back frame (7) and foam cushion member (40) have been formed together integrally in the illustrated configuration during a foaming process, such that the backward side of the seat back frame (7) is exposed outwardly on the backward vertical wall portion (40C) of the foam cushion member (40). The foam cushion member (40) has a forward wall portion (40A), a pair of lateral wall portions (40B) (40B), and the backward vertical wall portion (40C). The trim cover assembly (50) has a forward cover section (50A) covering the cushion member forward wall portion (40A), a pair of lateral cover sections (50B) (50B) covering the respective two lateral walls portions (40B) (40B) of cushion member (40), and a backward cover section (50C) which only covers the upper region of the backward wall portion (40C) of cushion member (40), excluding the lower frame portion (i.e. at 7A and 7B) of seat back frame (7).

Designation (2) represents a second reinforcing member provided on the backward side of seat back (SB). The second reinforcing member (2) comprises: a horizontal tubular reinforcing rod (20A); a slanted tubular reinforcing rod (20B); a first plate member (21A) of an L-shaped cross-section; and a second plate member (21B) of an L-shaped cross-section. As shown, the first plate member (21A) is formed with: a securing plate section (21A-1) in which a pair of vertically spaced holes (21Ah) (21Ah) are formed; and a load transmission plate section (21A-2) extending from the securing plate section (21A-1) at a right angle. Likewise, the second plate member (21B) is formed with: a securing plate section (21B-1) in which a pair of vertically spaced holes (21Bh) (21Bh) are formed; and a load transmission plate section (21B-2). Two ends of the horizontal tubular reinforcing rod (20A) are fixed, as by welding, to the two load transmission plate sections (21A-2) (21B-2), respectively, and, on the other hand, likewise, two ends of the slanted tubular reinforcing rod (20B) are fixed, as by welding, to the two load transmission plate sections (21A-2) (21B2), in such a manner that the slanted tubular reinforcing rod (20B) extends aslant downwardly (in a donwardly inclined direction) as it proceeds to its end fixed to the second plate member (21B) in a direction to the horizontal tubular reinforcing rod (20A), while being in a spaced-apart relation therewith.

The second reinforcing member (2) is firmly attached to the lower region of the seat back frame (7) by inserting the four securing screws (14) through the respective holes (21Ah) (21Bh) respectively of the first and second plate members (21A) (21B), and attaching the two securing plate sections (21A-1) (21B-1) respectively of the first and second plate members (21A) (21B) to the first and second vertical frame portions (7A) (7B) of seat back frame (7), respectively, so that all the holes (21Ah) (21Bh) are respectively aligned with all the securing holes (70) of seat back frame (7), and then, threadedly engaging the four securing screws (14) in the respective four securing holes (70), as indicated in FIG. 2. Thereafter, a backward decorative cover (8) is securely attached on a whole of backward side of seat back (SB) so as to cover the thus-fastened second reinforcing member (2), the outwardly exposed part of the seat back frame (7) as in FIG. 2, a part of the foam cushion member lateral portions (40B), a part of the trim cover assembly lateral cover sections (50B), and a part of the trim cover assembly backward cover sections (50C).

Accordingly, it is appreciated that both first and second reinforcing members (1) (2) can be fastened to the assembled unit of seat cushion (SC) and seat back (SB), or in other words, the first reinforcing member (1) is fixedly secured to the finished surface (trim cover assembly 5) of seat cushion (SC) and the second reinforcing member (2) is fixedly fastened to the outwardly exposed backward side portion of seat back frame (7), so that the reinforcing members (1) (2) are not any obstacle in assembling the seat (S), as found in the prior art. Further, since the first and second reinforcing members (1) (2) are provided on the outward sides of seat cushion (SC) and seat back (SB) and covered with the covers (6 and 8), both two reinforcing members (1) (2) are not any cause of an unpleasant hard touch to the body of occupant on the seat.

In that way, there is produced a resulting vehicle seat (S) as understandable from FIG. 3.

Now, with reference to the FIG. 3, there is shown a vehicle or automobile (V) in which is mounted the seat (S) with the structure (R) having the first and second reinforcing members (1) (2) provided in the respective seat cushion (SC) and seat back (SB) thereof. As is known in the art, the vehicle (V) has right-side and left-side lateral walls (A) (A') (including doors (not shown)), a floor (F), and a floor tunnel (B) formed protuberant in the center of the floor (F).

Designation (S') stands for another seat constructed in substantially the same manner as in the foregoing seat (S), excepting its seat structure (R') wherein the first plate member (21A) is situated at the left side of seat back (SB) whereas the second plate member (21 B) is situated at the right side of seat back (SB), and wherein two ends of the slanted tubular reinforcing rod (20B') are respectively fixed, as by welding, to the two load transmission plate sections (21A-2) and (21B-2) respective of the first and second plate members (21A) (21B), such that the slanted tubular reinforcing rod (20B') extends aslant downwardly (in a downwardly inclined direction) as it proceeds to its end fixed to the second plate member (21B) in a direction to the horizontal tubular reinforcing rod (20A), while being in a spaced-apart relation therewith.

The FIG. 3 is a schematic cross-section of the vehicle (V) as viewed from the forward side (FW) thereof, which thus shows the forward side (at 40A) of seat back (SB) and the forward side (at 5A or 6) of seat cushion (SC). As shown, the two seat (S) (S') are mounted on the floor (F) in the vehicle (V) so as to be disposed symmetrically relative to the floor tunnel (B). With regard to both two seats (S) (S') in common, it is observed that the first and second load transmission plate members (11A) (11B) in the seat cushion (SC) thereof are respectively disposed adjacent to the right-side vehicle lateral wall (A) and adjacent to the right-side lateral wall of the floor tunnel (B), and that the first and second load transmission plate sections (21A-2) (21B-2) in the seat back (SB) are respectively disposed adjacent to the right-side vehicle lateral wall (A) and adjacent to the right-side lateral wall of the floor tunnel (B). Also, it is observed that both two slanted tubular reinforcing rods (20B) (20B') extend in a downwardly inclined direction toward the floor tunnel (B).

FIG. 3 shows the case of a lateral collision occurs to the vehicle (V), in which a large vehicle (VL) or a small vehicle (VS) collides against one of both two lateral sides (A) (A') of vehicle (V) as indicated by the one-dot chain lines. In this case, a great load is directly applied to one of the two lateral sides (A) (A') of the vehicle (V) as indicated by the arrows. However, in accordance with the present invention, as viewed from the FIG. 3, if such laterally applied load is applied to the right-side (at A) of the vehicle (V), the load is imparted through the corresponding lateral side (A) to the first load transmission plate (11A) and load transmission plate section (21A-2). Then, the load is quickly transmitted through all the three reinforcing rods (10, 20A, 20B), the second load transmission plate (11B) and the load transmission plate section (21B) to the right-side wall of the floor tunnel (B), thereby escaping the load to the floor (F). Thus, the right-side seat (S) or both seat back (SB) and seat cushion (SC) are positively prevented against deformation. Likewise, a load applied to the left-side (A') of the vehicle (V) will be imparted through the corresponding lateral side (A') to the first load transmission plate (11A) and load transmission plate section (21A-2). The load is transmitted through all the three reinforcing rods (10, 20A', 20B'), the second load transmission plate (11B) and the load transmission plate section (21B) to the left-side wall of the floor tunnel (B), thereby escaping the load to the floor (F). Thus, the left-side seat (S') or the seat back (SB') and seat cushion (SC') are also positively vented against deformation. It is to be also appreciated that the provision of inclined reinforcing rods (20B, 20B') advantageously allows the load transmission plate section (21A-2) to be elongated vertically as desired so as to increase an area for receiving the aforestated lateral load, thereby allowing as much an amount of the load as possible to be transmitted to the floor tunnel (B) and thus adding to reinforcement of the seat (S or S').

It should be understood that the present invention is not limited to the illustrated embodiment, but any modification, replacement and addition may be applied thereto without departing from the scopes of the appended claims.

What is claimed is:

1. In combination with a vehicle having a lateral side, a floor and a floor tunnel formed upwardly in the floor, a structure of seat comprising:

a pre-assembled seat cushion having a seat cushion frame provided therein, a cushion member integral with said seat cushion frame, and a trim cover assembly securely attached on said cushion member, said pre-assembled seat cushion having a forward outer surface facing forwardly of said vehicle;

a pre-assembled seat back comprising a seat back frame provided therein, a cushion member integral with said seat cushion frame, and a trim cover assembly securely attached on said cushion member, said pre-assembled seat back having a backward outer surface facing backwardly of said vehicle;

a first reinforcing means for reinforcing said pre-assembled seat cushion, said first reinforcing means being securely attached on said forward outer surface of said pre-assembled seat cushion and comprising:
  a first reinforcing rod having a first end and a second end;
  a first plate element fixed to said first end of said first reinforcing rod; and
  a second plate element fixed to said second end of said first reinforcing rod;
wherein said first reinforcing rod is attached on said forward outer surface of said pre-assembled seat cushion and fixed to said seat cushion frame so as to extend in a direction transversely of the seat cushion, such that said first plate element is disposed adjacent to said lateral side of said vehicle, while said second plate element is disposed adjacent to said floor tunnel;
a second reinforcing means for reinforcing said pre-assembled seat back, said second reinforcing means being securely attached on a lower region of said backward outer surface of said pre-assembled seat back and comprising:
  a second reinforcing rod means having a first end and a second end;
  a first plate element fixed to said first end of said second reinforcing rod; and
  a second plate element fixed to said second end of said reinforcing rod;
wherein said second reinforcing rod is attached on said lower region of said backward outer surface of said pre-assembled seat back and fixed to said seat back frame so as to extend in a direction transversely of the seat back, such that said first plate element is disposed adjacent to said lateral side of said vehicle, while said second plate element is disposed adjacent to said floor tunnel;
a forward cover securely attached to said forward outer surface of said seat cushion so as to cover said first reinforcing means; and
a backward cover is securely attached to said backward outer surface of said seat back so as to cover said second reinforcing means.

2. In combination with a vehicle having a lateral side, a floor and a floor tunnel formed upwardly in the floor, a structure of seat comprising:
a pre-assembled seat cushion comprising a seat cushion frame provided therein, a cushion member integral with said seat cushion frame, and a trim cover assembly securely attached on said cushion member, said pre-assembled seat cushion having a forward outer surface facing forwardly of said vehicle;
a pre-assembled seat back comprising a seat back frame provided therein, a cushion member integral with said seat cushion frame, and a trim cover assembly attached on said cushion member, said pre-assembled seat back having a backward outer surface facing backwardly of said vehicle;
a first reinforcing means for reinforcing said pre-assembled seat cushion, said first reinforcing means being securely attached on said forward outer surface of said pre-assembled seat cushion and comprising:
  a first reinforcing rod having a first end and a second end;
  a first plate element fixed to said first end of said first reinforcing rod; and
  a second plate element fixed to said second end of said first reinforcing rod;
wherein said first reinforcing rod is securely attached on said forward outer surface of said pre-assembled seat cushion so as to extend in a direction transversely of the seat cushion, such that said first plate element is disposed adjacent to said lateral side of said vehicle, while said second plate element is disposed adjacent to said floor tunnel;
a second reinforcing means for reinforcing said pre-assembled seat back, said second reinforcing means being securely attached on a lower region of said backward outer surface of said pre-assembled seat back and comprising:
  a first plate element;
  a second plate element;
  a second reinforcing rod connected between said first and second plate elements so as to extend horizontally therebetween; and
  a third reinforcing rod connected between said first and second plate elements so as to extend slanted therebetween;
wherein said first and second plate elements are attached on said lower region of said backward outer surface of said pre-assembled seat back and fixed to said seat back frame, such that said second and third reinforcing rods extend in a direction transversely of the seat back, and that said first plate element is disposed adjacent to said lateral side of said vehicle, while said second plate element is disposed adjacent to said floor tunnel;
a forward cover securely attached to said forward outer surface of said seat cushion so as to cover said first reinforcing means; and
a backward cover is securely attached to said backward outer surface of said seat back so as to cover said second reinforcing means.

* * * * *